UNITED STATES PATENT OFFICE.

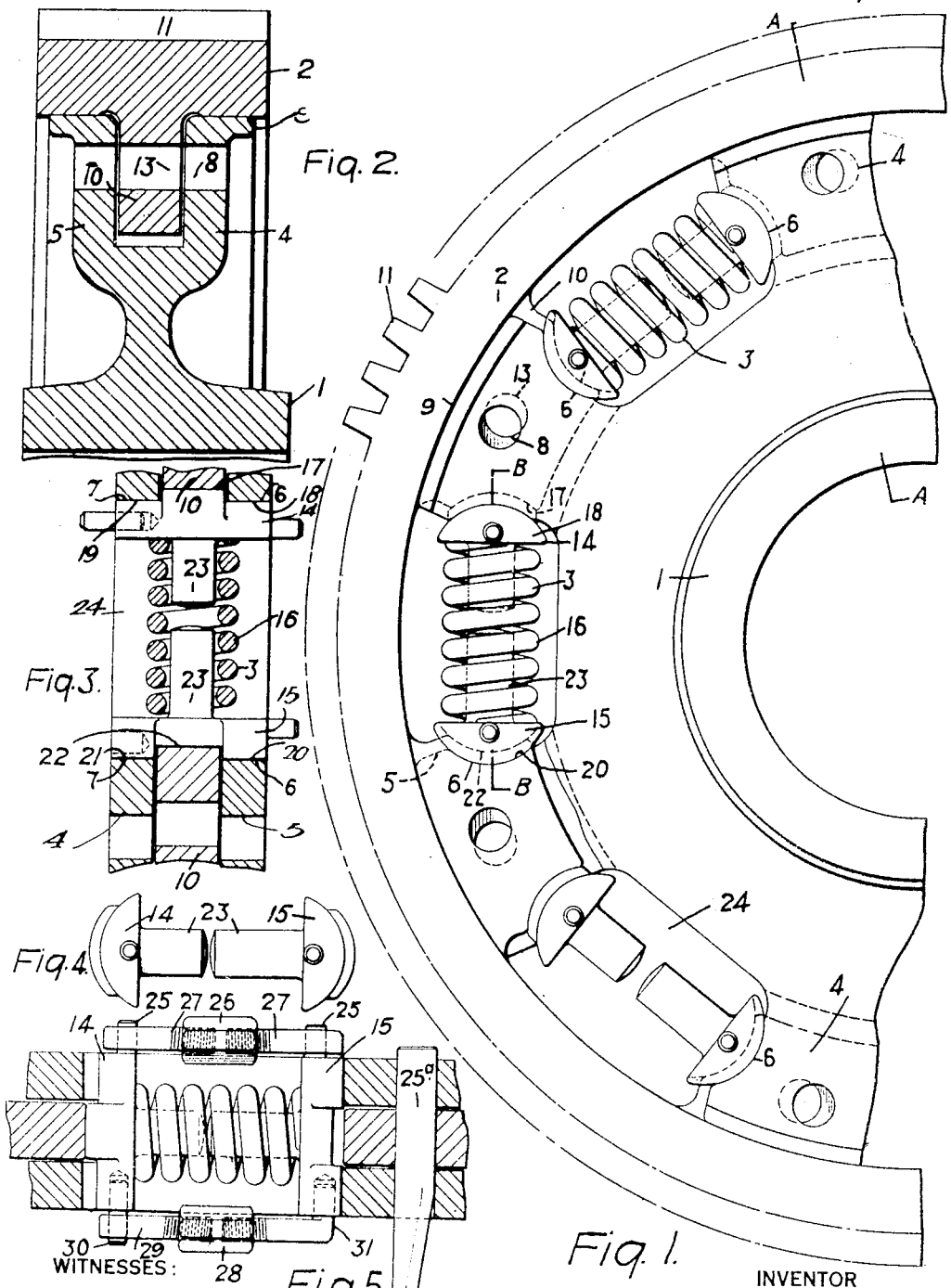

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT GEAR.

1,258,639. Specification of Letters Patent. Patented Mar. 5, 1918.

Application filed October 27, 1915. Serial No. 58,166.

*To all whom it may concern:*

Be it known that I, GEORGE M. EATON, a citizen of the United States, and a resident of Pittsburgh, in the county of Allegheny and State of Pennsylvania, have invented a new and useful Improvement in Resilient Gears, of which the following is a specification.

My invention relates to resilient gears and particularly to resilient gears employed between the driving motors and the driving wheels of electric-railway vehicles.

One object of my invention is to provide a gear of the above-indicated character which shall be simple and compact in construction, shall embody relatively few parts, and which may be conveniently assembled or dismantled.

Another object of my invention is to provide a gear in which the resilient connectors between the hub member and the floating or rim member are exposed for inspection, are restrained from movement laterally or radially to the gear, and may be renewed without dismantling the gear.

The resilient connectors between the hub and the floating members, in gears of the above character now in common use, are retained in position and are restrained from lateral movement by friction and by an annular member attached to the hub member or to the floating member, which, accordingly, prevents inspection or renewal of the connectors without considerable trouble in the dismantling of the gear.

According to my invention, however, the connecting means between the hub member and the rim or floating member have ridged cylindrical surfaces which engage projections on the hub and rim members and restrain the connecting means from movement laterally or radially with respect to the gear. Thus, the connecting means is left open to view and may be conveniently inspected or renewed.

In the accompanying drawing illustrating my invention, Figure 1 is a diagrammatic view of a portion of an assembled gear provided with my preferred resilient connectors; Fig. 2 is a sectional view taken on the line A—A, Fig. 1; Fig. 3 is a sectional view along the line B—B, Fig. 1; Fig. 4 is a detail view showing a modification of my preferred connector, and Fig. 5 is a sectional view disclosing means for inserting or removing connectors from the gear.

Referring to the drawing, the apparatus shown comprises a hub member 1 and a rim member 2 connected by a number of resilient connectors 3.

The hub member 1 is provided with sets or pairs of radial projections 4 and 5 spaced laterally from each other around its periphery and having seats 6 and 7 which are cut with the same radii to form bearing surfaces for the connectors 3. The members 4 and 5 are provided also with holes 8 for a purpose which will be explained later and with surfaces 9 which serve as bearing surfaces for the rim member 2.

The rim member 2 is annular in form, has gear teeth 11 around its periphery and is provided with radial projections 10 which are disposed between the projections 4 and 5 of the hub member 1. The projections 10 are provided with seats 12 which are cut with the same radii as the seats 6 and 7 of the hub member 1 and are adapted to engage the curved surfaces of the connectors. The projections 10 are provided with holes 13 for a purpose which will be explained later.

Each of the connectors 3 embodies two retaining members 14 and 15 and a coil spring 16 located between them. In my preferred form of connector, which is illustrated in Figs. 1, 2 and 3, the two members 14 and 15 are dissimilar in form, whereas, in the modification shown in Fig. 4, the two retaining members are like the retaining member 14. In my preferred connector, one surface 17 of the member 14 is raised above the two surfaces 18 and 19, and the three surfaces are cut with the same radii as the seats 6 and 7 on the projections 4 and 5. On the retaining member 15 two surfaces 20 and 21 are raised above the surface 22, and the three surfaces 20, 21 and 22 are cut with the same radii as the seats 6 and 7. The retaining members 14 and 15 are provided also with shanks 23 for supporting the coils 16.

In assembling the resilient gear illustrated, the rim member 2 is placed on the hub member 1, with the projections 10 disposed between the projections 4 and 5. These projections, as has been set forth, are of similar form and, moreover, should be of the same length, for a purpose that will be explained later. Between the sets of projections, thus formed, are openings 24 through the gear and in which the connectors 3 are disposed. In constructing the gear, the openings 24 in the hub member must be of a length sufficient to allow the projections 10 of the rim member to pass therethrough in assembling. In placing the connectors 3 in position, the springs 16 are first mounted on the retaining members 14 and 15 and then these members are compressed until the connectors can be slipped into the opening 24. When the connectors are in position, the surfaces 18 and 19 of the retaining member 14 and the surfaces 20 and 21 of the retaining member 15 engage the projections 4 and 5 of the hub member 1, and the projections 10 of the rim member 2 engage the surfaces 17 and 22 of the retaining members 14 and 15, as shown in Fig. 3. The raised surfaces 17 and the depressed portions 22 provide shoulders spaced apart laterally approximately the same distance as the projections 4 and 5. Thus, the connectors are held in place by a spring 16 and are prevented from moving in a direction parallel to the axis of the gear by means of the ridged surfaces or shoulders on the retaining members and are prevented from moving in a radial direction with respect to the gear because of the cylindrical curvature of the bearing surfaces.

The lengths of the shanks 23 of the retaining members is such that a limited amount of relative movement between the hub member 1 and the rim member 2 is permitted, after which engagement of the shank portions 23 is effected, and the driving effort is transmitted directly and positively through them.

The connector having dissimilar retaining members is preferred because the spring 16 need not be compressed to the extent that the spring having similar retaining members, as in Fig. 4, must be compressed in order to insert and remove the connector from the gear, and, therefore, a stronger spring may be utilized.

In Fig. 5, an auxiliary apparatus is illustrated for enabling the connector to be inserted in, or removed from, the openings or pockets 24. This apparatus consists, first, of a wedge 25$^a$ adapted to be forced into the holes 8 of the projections 4 and 5, in order to aline the holes 13 of the projection 10 therewith and to place the rim and hub members in the relative positions shown in Fig. 5. Pins 25, which may be formed integral with the retaining members 14 and 15, at one side, may be drawn toward each other by means of a turn buckle 26 and eye-bars 27. The opposite sides of the retaining members may be drawn toward each other by a turn buckle 28, an eye-bar 29 and pins 30 and 31 which coöperate with holes in the sides of the retaining members. From the above, it is evident that the wedge 25$^a$ forces the projections of the rim and hub members into proper coöperative relation to one another and that the turn buckles 26 and 28 and the parts actuated thereby serve to so compress the connector spring that it may easily be removed from, or inserted within, the opening 24. As the projections on the rim and hub members are of the same length, connectors may only be removed when the hub and rim members are in one relative position.

It is evident that modifications in the specific structural details may be effected without departing from the spirit and scope of my invention, and I desire that only such limitations shall be imposed as are indicated in the appended claims.

I claim as my invention:

1. In a driving connection, the combination with a hub member and a rim member, one of said members having pairs of laterally spaced radial projections and the other member having radial projections disposed between said spaced projections and registering therewith to form intervening openings, of means in said openings for resiliently joining said hub and rim members, and retaining members engaging said means and provided with shoulders spaced apart approximately the same distance as said pairs of projections for preventing lateral displacement of said retaining members.

2. In a resilient gear, the combination with a hub member having pairs of laterally spaced radial projections, of a rim member having radial projections disposed between said pairs of projections registering therewith to form intervening openings extending through said gear, resilient means in said openings for resiliently joining said hub and rim members, and pairs of retaining members for each of said resilient means provided with shoulders spaced apart approximately the same distance as said projections on the hub to prevent lateral displacement of the retaining members and the resilient means.

3. In a resilient gear, the combination with a hub member and an annular rim member surrounding said hub member, of integral angularly spaced coöperating radial projections on said members forming intervening openings through the gear, and devices inserted in said openings and interposed between the projections on opposite sides of the opening for resiliently joining said hub and rim members, each device embodying two retaining members and a resilient member therebetween, one of said retaining members having a projecting surface coöperating with a rim projection and the other retaining member having a groove which coöperates with a rim projection.

4. In a resilient gear, the combination with a hub member having laterally-spaced radial projections and a rim member having radial projections disposed between said hub projections, said projections being arranged in sets, with openings through the gear therebetween, of means inserted in said openings for resiliently joining said hub and rim members and each embodying two retaining members and a resilient member therebetween, one of said retaining members having a projecting surface coöperating with a rim projection and the other retaining member having a groove which coöperates with a rim projection.

In testimony whereof, I have hereunto subscribed my name this 25th day of Oct., 1915.

GEORGE M. EATON.

Copies of this patent may be obtained for five cents each, by addressing the "Commissioner of Patents, Washington, D. C."